United States Patent [19]
Dine et al.

[11] 3,836,927
[45] Sept. 17, 1974

[54] CLOSE-UP FLASH CAMERA ATTACHMENT

[76] Inventors: Lester A. Dine, 145 Grist Mill Ln., Great Neck; Edgar S. Lemmey, 73 Lester Ave., Freeport, both of N.Y.

[22] Filed: Dec. 22, 1972

[21] Appl. No.: 317,836

[52] U.S. Cl.................... 354/80, 354/128, 355/71
[51] Int. Cl. ........................................... G03b 17/56
[58] Field of Search............ 95/11 L, 44 R; 240/1.3, 240/2 C; 354/80, 128; 355/71

[56] References Cited
UNITED STATES PATENTS

| | | | |
|---|---|---|---|
| 3,451,321 | 6/1969 | Raia et al. ....................... | 95/44 R X |
| 3,456,101 | 7/1969 | Rentschler et al. .................. | 240/1.3 |
| 3,687,030 | 8/1972 | Dine et al. ........................... | 95/11 R |
| 3,721,169 | 3/1973 | Johnson ............................. | 95/11 L |
| 3,745,323 | 7/1973 | Morse ................................ | 240/1.3 |

*Primary Examiner*—Samuel S. Matthews
*Assistant Examiner*—Kenneth C. Hutchison
*Attorney, Agent, or Firm*—Darby & Darby

[57] ABSTRACT

A flash camera attachment for close-up use including a mounting member attachable to the camera so that a variable size aperture is positioned between the camera flash and the subject. An interchangeable locator unit locates the subject to be photographed at a predetermined distance and modifies the focal length of the camera to the same distance. A legend is associated with each locator unit and corresponding indicia is provided on the variable size aperture to indicate the extent to which the aperture is opened to permit an appropriate amount of the flash light to be transmitted.

1 Claim, 6 Drawing Figures

PATENTED SEP 17 1974  3,836,927

3,836,927

CLOSE-UP FLASH CAMERA ATTACHMENT

BACKGROUND OF THE INVENTION

This invention relates generally to photography equipment and, more particularly, to camera attachments for facilitating close-range photography.

Close-range photography (such as where the subject to be photographed is between about 2 and 18 inches from the camera) is presently being used in various diverse applications. For example, such photography presently finds wide use in various medical, dental, journalistic, and law enforcement applications as well as for pleasure by amateur photographers.

Close-range photography presents problems which are not common to photography in general. For example, positioning of the subject and selection of the proper lens focal distance is necessarily a more exacting procedure requiring greater care in close-up photography than in ordinary photographic applications. The solution of such problems as these is the object of the invention disclosed in U.S. Pat. No. 3,687,030, granted Aug. 29, 1972 to Lester A. Dine et al.

The use of a flash-type light source for close-up photography presents an additional problem in that as the distance between the camera lens and the subject is varied, the intensity of the light from the camera flash incident on the subject correspondingly varies. That is, the light incident on a subject which is at a maximum distance (18 inches, for example) from the camera lens is substantially less than if the same subject was positioned at a 2-inch distance for the same amount of light emanating from the flash source. Such disparity in lighting may result in a variation in contrast when successive exposures of a subject at different distances from the camera are taken. Such disparity makes a detailed study of the photographs more difficult and, in some cases, impossible. Thus, it is particularly advantageous in close-range photography for the intensity of light from a flash source incident on a subject to be maintained constant regardless of the positioning of the subject with respect to the camera.

Further, it is desirable that this constant illumination intensity capability be providable on currently existing cameras via a relatively uncomplicated procedure so as to enable easy and quick conversion from the normal camera operation to the close-range operational mode.

Accordingly, one object of this invention is to provide a new and improved camera attachment for insuring proper illumination of a subject photographed at close range by a camera equipped with a flash-type light source.

Another object of the invention is the provision of a new and improved camera attachment which will provide proper illumination of the subject from a flash at various close-range distances from the camera lens.

Still another object of the present invention is to provide a new and improved camera attachment which will facilitate proper focusing and framing of close-range subjects in addition to insuring proper illumination of the subject during the flash exposure.

A further object of the instant invention is to provide a new and improved camera attachment enabling constant illumination of a subject at various close-range distances from the camera.

SUMMARY OF THE INVENTION

Briefly, in accordance with a preferred embodiment of this invention, these and other objects are obtained by providing apparatus which permits the amount of light emanating from the flash source towards the subject to be varied according to the distance between the subject and the camera. Broadly, such apparatus includes a mounting member attachable to the camera and including an aperture positioned between the flash source and the subject adjustable in size and/or light transmissibility to vary the amount of light available from the flash source. Indicia are provided on the variable-size aperture which are correlated to interchangeable locator units attachable to the mounting member. Each locator unit serves to assist in positioning the subject at an individual predetermined distance from the camera, each particular predetermined distance indicated by a particular legend. A particular close-up lens associated with each locator unit is supported by the mounting member to overlie the camera lens, to modify the focal length of the resulting lens system to the proper value for the particular predetermined distance.

DESCRIPTION OF THE DRAWINGS

A more complete appreciation of the invention and many of the advantages thereof will be readily obtained by reference to the following detailed description when considered in connection with the accompanying drawings in which.

DESCRIPTION OF A PREFERRED EMBODIMENT

Figure 1:
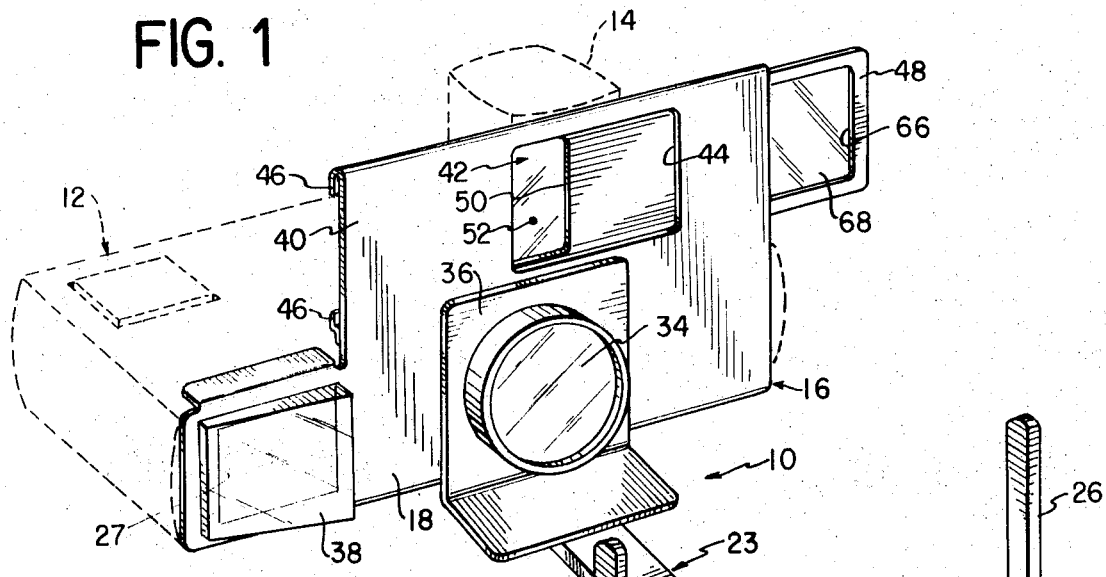
FIG. 1 is a perspective view of the camera attachment of the present invention attached to a conventional camera which is shown in dotted lines.

Referring now to the drawings wherein like reference characters designate identical or corresponding parts throughout the several views, and more particularly to FIG. 1, the camera attachment of the present invention, denoted generally as 10, is shown mounted on a camera 12. The camera may be any one of a number of conventional fixed or variable focus cameras with which a flash-type light source may be used. Such flash sources include flash bulbs, flash cubes, electronic flashes and the like. The invention is illustratively shown in use with a Kodak Pocket Instamatic fixed focus camera having a built-in flash source 14 of the flash-cube type. In the case of a variable-focus camera, the focus of the camera lens is left fixed at a predetermined point, such as infinity. Further, the invention is not limited to cameras having built-in flash units but also may be applied to cameras using externally mounted flash units as explained below.

Still referring to FIG. 1, the camera attachment 10 includes an L-shaped mounting member or bracket 16 including a front plate portion 18 which extends over the front of the camera 12 and an integral bottom plate portion 20 which in the present embodiment is connected as explained below to the lower side of camera 12. A retaining screw 22 (FIG. 4) is provided in the bottom plate portion 20 adapted to cooperate with a threaded bore (not shown) formed in the camera housing (which may be the usual tripod mounting socket) to affix the mounting bracket 16 to the camera. Other conventional means for attaching the bracket to the camera may be employed within the scope of the invention. For example, see the discussion below relative to the structure illustrated in FIG. 6. The mounting bracket is normally formed of an opaque material, for example metal, which has been rendered highly light-absorptive by painting its surfaces with black paint or covering them with black material. Openings 25 and 27 are formed in those areas of front plate portion 18 which overlie the camera lens and viewfinder so that the subject may be viewed and photographed through the viewfinder and lens respectively, even when the bracket 16 is in place.

A further portion of the camera attachment 10 is a measuring or locator unit 23. In FIG. 1, the locator unit 23 includes a rigid locator arm 24 having a picture-bracketing frame at one end and a close-range lens described in greater detail below at the other end. The latter end of locator unit 23 is attached to mounting bracket 16 in any conventional manner. For example, as illustrated in the preferred embodiment, the end of arm 24 opposite frame 26 has a tang 28 which is received in a slot 30 (FIG. 4) provided in detent housing 31 on the bottom portion 20 of mounting bracket 16. A spring biased ball detent mechanism including a ball 32 biased in an upward direction by a spring 33 is provided within housing 31. The ball is adapted to be urged into an indentation 35 in tang 28 in a well known manner in order to releasably lock the locator unit in position to enable easy interchangeability of locating units.

Returning to FIG. 1, a close-up lens 34 is fixed in a plate 36 which is suitably fastened to locator arm 24 so as to position lens 34 immediately adjacent to and overlying the built-in lens of the camera 12. Lens 34 is appropriately chosen so that the focal length of the resulting lens system comprising the camera lens and lens 34 is suitable to produce a focus for a distance equal to the length of locator arm 24. Thus, the provision of the locator arm 24 and associated lens 34 modifies the focal length of the fixed or preset camera lens to the desired focal length for photographing at a distance equal to the length of locator arm 24. The various interchangeable locator units have different lengths of locator arm and correspondingly different close-up lenses. Mounting bracket 16 further includes a sighting window 38 fastened over the opening overlying the camera viewfinder. Sighting window 38 is formed of transparent glass or plastic which is suitably optically configured to correct for parallax error which would be present in the use of camera 12 with close-range subjects. As shown in FIG. 1, this may be accomplished by forming the sighting window as a wedge or prism of appropriate angle corresponding to the length of locator arm 24.

Figure 3:
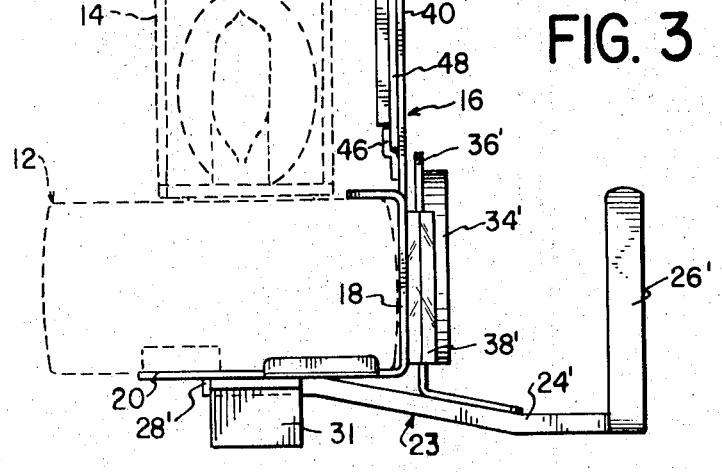
FIG. 3 is a side view of the camera attachment with the camera in dotted lines, with a different locator unit from that shown in FIGS. 1 and 2.

It is to be understood that a plurality of interchangeable locator units are provided within the scope of the invention. More specifically, it is contemplated that a photographer may choose any one of a number of available locator units depending upon the particular desired distance of the subject from the camera lens, determined by the desired field of view. Each locator unit includes a locator arm 24 of a certain length and a close-up lens 34 which, during cooperation with the camera lens, converts the focal distance of the resulting lens system to be substantially the same as the length of the locator arm. Therefore, it is only necessary to place the picture-bracketing frame 26 into abutting relationship with the subject to place the subject at the focal point of the camera. As shown in FIG. 3, another locator unit comprising a locator arm 24' of shorter length than locator arm 24 may be utilized in conjunction with close-up lens 34' which cooperates with the camera lens to convert the focal length of the lens system to a distance substantially identical to the length of locator arm 24'. In this instance, the frame 26' is of a size appropriate to the field of view for the selected distance.

Figure 2:
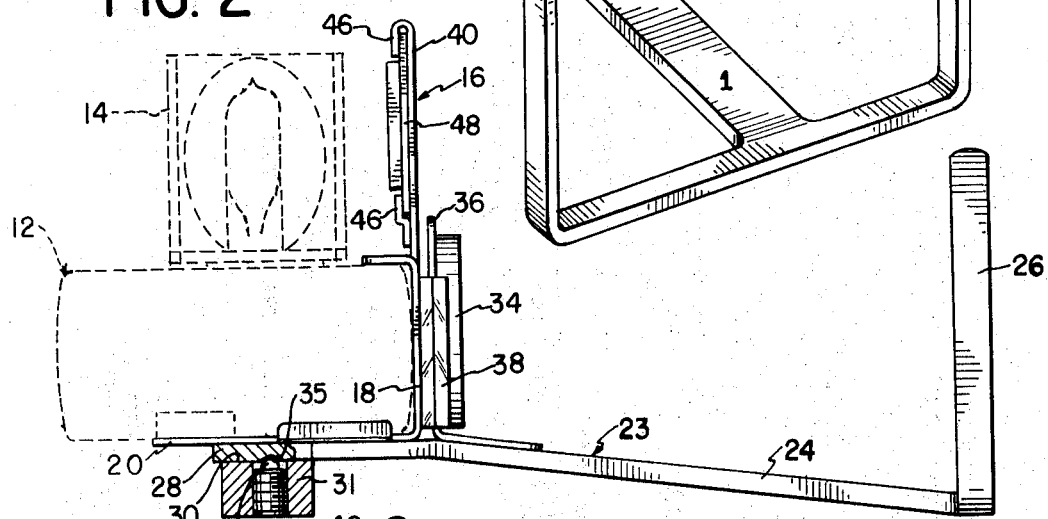
FIG. 2 is a side view of the camera attachment with the camera shown in dotted lines.

It is one of the objects of this invention to assure that the intensity of the light incident on the subject to be photographed is substantially the same regardless of its distance from the camera. For example, it is desired that the illumination of the subject be the same whether the subject is at a distance from the camera lens defined by locator arm 24 (FIG. 2) or whether it is at a position defined by the shorter locator arm 24' (FIG. 3) or at any other distance defined by other locator arms of different lengths from those shown in the figures. Towards this end, the mounting bracket 16 is extended upwardly to form an upper plate portion 40 which extends adjacent the flash source 14 and is interposed between the flash and the subject to be photographed. A variable-size aperture 42 is formed in upper plate portion 40 substantially opposite flash source 14, the size of the aperture being determined by the particular locator unit employed at the time — the greater the subject distance, the larger the aperture opening.

The variable-size aperture 42 is defined by a first window 44 formed in upper plate portion 40 adjacent to the flash 14. A pair of opposed parallel flanges 46 formed on the rear surface of the upper plate portion 40 function as guides for a slide member 48 which has a second window 50 formed therein, which window may have a translucent light diffuser 52 covering it. The dimensions of the flanges 46 and slide member 48 are such that the latter is snugly received in the flanges so that although the slide member may be manually indexed or set to different positions, it cannot be accidentally moved during normal handling of the apparatus. Thus, by moving slide member 48 in flanges 46, the second window 50 may be moved into and out of overlapping relationship with first window 44. As the extent of overlap of the two windows is increased, the size of aperture 42 increases and, consequently, the amount of light transmitted through the aperture 42 increases upon actuation of the flash source.

In order to achieve uniform intensity of illumination of the subject at various distances from the camera lens, the size of the aperture 42 is varied according to the particular locator unit being used, i.e. where the locator arm 24 is relatively long, the size of aperture 42 is made larger to transmit more light since a larger portion of light will be dissipated over a longer distance than a shorter distance. To provide a correlation between the locator units and the size of the aperture, each locator unit is provided with its own legend which indicates the relative length of the locator arm or, alternatively, the focal length of the lens system. For example, in the embodiment shown in the figures, the legend numeral 1 is associated with the locator unit shown in FIG. 1, while the locator unit shown in FIG. 3 has a legend 2 associated therewith.

Figure 4:
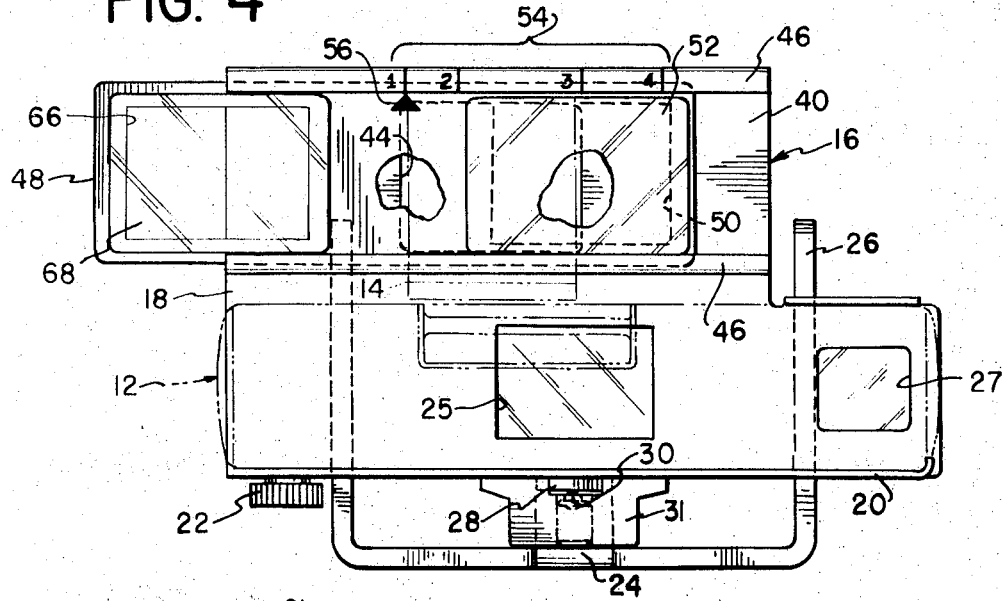
FIG. 4 is a rear view of the camera attachment from behind the camera shown in dotted lines.

Turning now to FIG. 4, the upper plate portion 40 is provided with a series of markings 54, in this case a series of spaced numerals, each marking associated with a particular locator unit legend. These markings are fixed with respect to the first window 44. An index mark 56 is provided on the slide member 48 in fixed position relative to the second window 50. This index 56 is adapted to be positioned adjacent to a selected one of the various markings 54 as the slide member 48 is moved withing flanges 46. Thus, as arrow 56 is positioned opposite the various indices, the size of the aperture 42 is varied accordingly.

In operation, the mounting bracket 16 shown in FIG. 1 is fixed to camera 12 by screw 22. A particular locator unit 23 is then chosen depending upon the particular distance from the camera at which the subject to be photographed will be positioned or the desired size of the field of view to be photographed. The locator unit is attached to the mounting plate by inserting the tang 28 into slot 30 and is locked in place by the ball detent. The legend associated with that particular locator unit is then noted. For example, if the locator unit shown in FIG. 1 is employed the photographer will note the locator unit legend 1. The size of the aperture 42 is then set by moving slide member 48 until arrow 56 is opposite the marking indicating the appropriate numeral, in this case 1 (see FIG. 4), thereby properly setting the size of aperture 42. The relative positioning of the markings may be empirically predetermined so that the aperture 42 is of the appropriate size to transmit an amount of light from flash 14 which will illuminate the subject in a uniform manner relative to the illumination at other distances. Thus, through the unique cooperation between the legends provided on the locator units indicative of the focal point of the lens system and also the length of locator arm 24 and the markings formed on the upper plate portion 40, a uniform illumination of the subject at any one of a number of distances proximate to the lens system is achieved.

Figure 5:
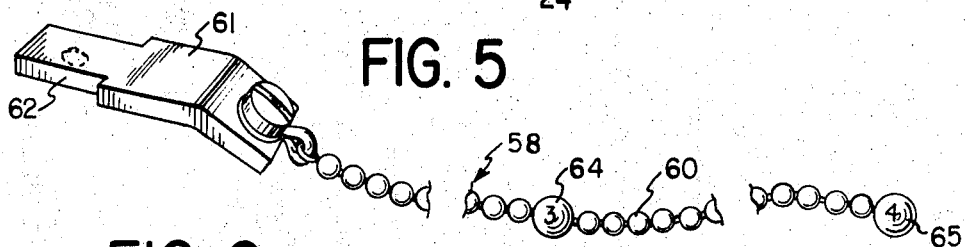
FIG. 5 is a partial view of a flexible locator unit which forms an alternative element of the camera attachment according to the invention.

Referring to FIG. 5, another type of locator unit 58 is illustrated comprising a flexible member such as, for example, a bead-type chain 60 having one end connected to a fastening member 61 having a tang 62 which extends rearwardly from it identical in shape to the tang 28 formed in the above-described locator units 23. The locator unit 58 may generally be used when the subject is at a relatively longer distance from the camera lens (for example, 16 to 20 inches). At various intervals along the length of chain 60, indicators such as enlarged beads 64, 65 are provided which indicate various possible positions of the subject to be photographed when the chain is held taut extending forwardly from the camera. Each enlarged bead has a legend associated with it similar to the legends associated with locator units 23. For example, the pair of beads 64, 65 shown in FIG. 5 have the respective legends 3 and 4. When the subject is placed at a distance from the camera lens defined by the distance of bead 64 associated with legend 3, the slide member 48 is shifted until the arrow 56 lies opposite the numeral 3. In this case, in the preferred embodiment, a third window 66 is formed in slide member 48 which may have a clear transparent plate 68 fastened over it or may be open. Upon the shifting of slidable member 48 to this position, third window 66 moves into overlapping relationship with the first window 44. Thus, rather than having the translucent diffuser 52 positioned in the aperture 42, the transparent or apertured plate 68 becomes operative to permit a greater amount of light to be transmitted through the aperture 42. Slidable member 48 is similarly shifted until arrow 56 points to mark 4 when the subject is positioned at the distance corresponding to enlarged bead 65.

It should be noted that the lens of a fixed focus camera may be adjusted so that it is focused at a relatively close focal point, e.g. 20 inches, resulting in making the use of an additional close-up lens unnecessary. Although this is most probable when the subject is positioned at the abovementioned relatively longer distances, it is recognized that such may be the situation at closer distances also, i.e. when the locator unit having the rigid arm is employed. If an additional close-up lens is necessary, one may be provided directly over the existing camera lens or may be housed in a plate attached to tang 61 adapted to be positioned adjacent to the camera lens. In all cases, the parallax correction must be provided by prism 38.

The size of the aperture 42 corresponding to each particular distance of the subject from the camera lens may be varied by the user according to the particular results desired, by setting the slide 48 at positions other than those marked. Further, various diffusers having different characteristics may be provided on any one or more of the windows in order to predetermine the amount of light transmitted from the flash to the subject for each slide position.

Of course, numerous variations and modifications of the invention may be made within the scope of the appended claims. For example, the upper plate portion 40 need not be integral with the mounting plate. Instead, any suitable plate having a variable-size aperture may be modified so that it can be mounted on the flash unit with the aperture positioned between the flash source and the subject to be photographed. Thus, the invention may be used not only with built-in flashes, but also may be employed with external flash attachments.

Although the camera attachment of the present invention has been illustrated in conjunction with the Kodak Pocket Instamatic camera, the camera attachment may be suitably modified to be compatible with other cameras than that shown. Further, other legends and indicia may be used in lieu of the numeric system shown in the drawings. For example, a color coding system may be used, wherein each locator unit has a different color marked on it such, for example, as around the rim of the close-up lens or along the length of the locator arm. Similarly, each enlarged bead of locator 58 would be associated with a different color. In this case, the markings 54 would be of corresponding colors and the arrow 56 would be indexed to a position opposite the particular color of the locator unit presently being used.

Figure 6:
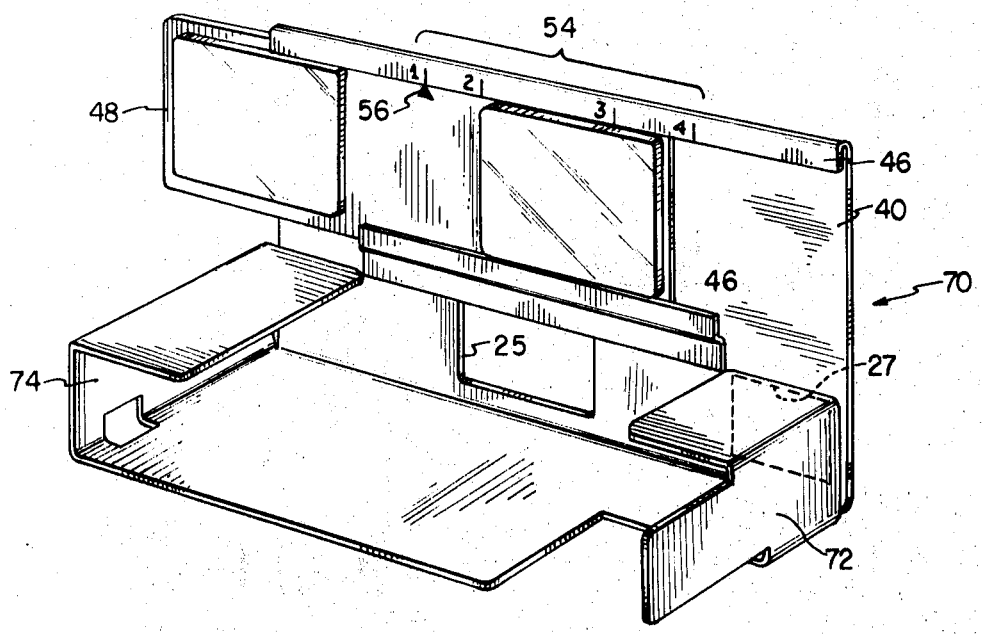
FIG. 6 is a rear perspective view of a form of the camera attachment having an alternative bracket.

Another modification of the invention is shown in FIG. 6 wherein an alternative bracket 70 is illustrated for use with a camera similarly configured as the one shown in FIG. 1 but which does not have a tripod socket. Bracket 70 includes a pair of sides 72, 74 which are formed to wrap around the camera and are dimensioned so that a snug fit is obtained when the bracket is fit over the camera. Other modifications and variations are readily conceivable, and are to be deemed within the scope of the invention as defined by the appended claims.

What is claimed is:

1. An attachment for a camera having a lens and a flash-type light source for facilitating flash exposures of a subject located at one of a number of particular proximate distances from the camera comprising:

a mounting member having a generally L-shaped cross-section including a first leg comprising a surface adapted to be fixed to said camera and a second leg comprising a surface adapted to extend in front of said lens and said flash source upon said first leg being fixed to said camera, said second leg having an aperture for said lens and a flash aperture formed therein, said apertures adapted to be positioned opposite the lens and flash source respectively upon said first leg being fixed to said camera;

a plurality of locator units interchangeably mountable on said mounting member, each of said locator units including a locator arm adapted to extend forwardly from said mounting member for one of said particular proximate distances and a close-up lens adapted to be positioned over said lens aperture to modify the focal point of the camera lens to substantially said one of said particular proximate distances;

an elongate slider movably mounted on said second leg, said slider being manually positionable in any one of a continuum of positions adjacent to said flash aperture, said slider having a pair of slider apertures formed therein, one of said slider apertures having a translucent diffuser completely filling the space defined thereby and the other slider aperture being transparent, said slider being manually movable to a selected position wherein one of said slider apertures overlaps said flash aperture to a predetermined extent;

a legend affixed to each of said locator units indicative of one of said particular proximate distances; and indicia affixed to said mounting member and to said slider including a first index affixed to said mounting member adjacent to said slider and a second index affixed to said slider adjacent to said first index, one of said first and second indices comprising a linear index and the other index comprising a single reference location, the position of said slider index relative to said mounting member index and the extent of overlap of one of said pair of slider apertures and said flash aperture being determined by said legend affixed to said locator unit.

* * * * *